United States Patent Office 3,447,991
Patented June 3, 1969

3,447,991
METHOD OF USING IMPROVED
ASPHALTIC ADHESIVE
Russell E. Koons, St. Louis, Mo., assignor to Monsanto Company, St. Louis, Mo., a corporation of Delaware
No Drawing. Filed July 22, 1964, Ser. No. 384,541
Int. Cl. C09j 3/00; B32b 13/10
U.S. Cl. 156—337                                        9 Claims

ABSTRACT OF THE DISCLOSURE

An improved adhesive composition for adhering wooden surfaces to concrete surfaces which comprises 30 to 60 percent by weight of an asphalt having a penetration at 77° F. of 60 to 160 mm./10, 5 to 30 percent by weight of a solvent comprising a hydrocarbon of 6 to 9 carbon atoms, 20 to 60 percent by weight of an unexpanded vermiculite and 1 to 10 percent by weight of asbestos fibres.

---

The present invention relates to asphaltic compositions.

More particularly, the present invention relates to asphaltic compositions having particular utility as adhesive and to the use of such compositions.

In recent years, aspaltic compositions have been finding an ever increasing utilization in the building industry. Asphaltic compositions are used as coatings, sealing and calking materials, in roofing, and as adhesives for adhering insulation, nailing strips and the like to wooden, concrete and other such surfaces encountered in building construction. The use of asphaltic compositions to adhere wooden nailing strips to concrete subfloors and walls for anchoring wooden flooring, as base plates and as studding, has only recently attained considerable significance and is continuing to increase. It is toward asphaltic compositions for the utility that the present invention is directed.

The asphaltic compositions generally presently accepted for use in adhering wooden nailing strips to concrete surfaces suffer several disadvantages. Particularly, these asphaltic compositions are "hot applied" compositions meaning that before they can be applied it is necessary to first heat the asphalt to a molten state. Thus, it is necessary to have heating kettles or other provision for heating these asphaltic compositions at every job site. To have to heat the asphaltic composition prior to use is both cumbersome and time consuming. In the use of these hot applied asphalts care must be exercised to prevent contact of the hot asphalt with the laborer's skin and the asphaltic composition must be rapidly applied to prevent premature cooling. Further, as the hot asphaltic composition comes into contact with the concrete and wood, any moisture present in the wood or concrete near their surfaces is vaporized and caused to exit the surface pores thus causing the asphaltic composition to cool at the surface of the wood or concrete and not penetrate the pores of these materials. This lack of penetration of the asphaltic composition into the pores of the wood or concrete materially reduces the strength of the bond between the asphaltic composition and the wood or concrete. Additionally, it is relatively difficult to obtain an even and uniform setting or curing of the hot applied asphaltic adhesive compositions.

Attempts have been made to find an asphaltic composition which may be "cold applied" or applied at ordinary ambient temperatures. However, this is rather difficult to obtain since asphaltic materials which are sufficiently fluid for application at ordinary temperatures requiring long setting or curing periods. Further, in climates having a wide range of temperatures, it is difficult to find an asphaltic material fluid at lower temperatures which will not run or exude from the bond under warm or hot climatic conditions. Conversely, ahphaltic materials which do not run under warm or hot climatic conditions, generally are too stiff for application and adhesion under cooler or cold climatic condtions. To offset the difficulty of findings an asphaltic material which may be cold applied under a variety of climatic conditions, resort has been made to the use of various solvents such as naphthas, kerosene and to fillers such as asbestos and sand. However, usually the resulting asphaltic compositions have been found unacceptable for cold applications as an adhesive for adhering wooden nailing strips to concrete surfaces.

It is now an object of the present invention to provide a new and improved asphaltic composition. Another object of the present invention is to provide a new and improved asphaltic composition suitable as an adhesive composition. It is also an object of the present invention to provide a new and improved asphaltic composition suitable for adhering wooden nailing strips to concrete. Another object of the present invention is to provide a new and improved asphaltic composition suitable for use as an adhesive which composition does not require heating for application. It is another object of the present invention to provide a new and improved method of adhering wooden surfaces to concrete. Additional objects will become apparent from the following description of the invention herein disclosed.

In fulfillment of these and other objects, a new and improved adhesive composition has been found, said composition comprising 30 to 60 percent by weight of an asphalt having a penetration at 77° F. of 60 to 160 mm./10, 5 to 30 percent by weight of a solvent comprising a hydrocarbon of 6 to 9 carbon atoms, 20 to 60 percent by weight of an unexpanded vermiculite and 1 to 10 percent by weight of asbestos fibres, the four components totaling 100 percent. It has been found that wooden nailing strips may be caused to strongly adhere to concrete surfaces by application of the above described asphaltic composition to either or both of the adjacent surfaces of the wood or concrete. The application of the asphaltic adhesive composition may be made without the application of heat to said asphaltic composition. The present asphaltic composition produce a strong bonding between the wooden nailing strip and the concrete. Also, the present asphaltic compositions are easy to apply and dry or cure uniformly and rapidly.

The asphalts useful in the present invention generally are those having a penetration at 77° F. (100 gram load for 5 seconds) of approximately 60 to 160 mm./10, a softening point of at least 110° F. and having a minimum flash point of 500° F. A particularly useful asphalt is one having a penetration at 77° F. of 85 to 100 mm./ 10. The asphalts of the present invention are obtained by commonly used refining or treating processes, such as distillation, steam, and/or vacuum reduction, air-blowing, solvent extraction, etc. Various petroleum asphalts may be used such as those obtained from California crudes, mid-continent air-blown oils, South Arkansas crudes, Mexican petroleum asphalts and the like. The primary requisites of the asphalts of the present invention are the above defined penetrations, softening point and flash point properties. The amount of asphalt present in the asphaltic compositions of the present invention is usually within the range of 30 to 60 percent by weight of the total composition. Most often, however, the amount of asphalt present in the adhesive asphaltic composition is approximately 40 to 50 percent by weight of the total composition. A particularly preferred composition of the present invention is one containing 43 to 46 percent by weight of the above defined asphalt. In preparing the present compositions for their most effective utilization under cold climatic conditions, the amount of asphalt present is usually 1 to 2 percent by weight less than the amount present in compositions for general utilization.

The hydrocarbon solvents of the present invention are those of 6 to 9 carbon atoms and may be either straight-chain, branched-chain or cyclic or a mixture of these. Included within the hydrocarbon solvents useful in the present invention are paraffin hydrocarbons, naphthenic hydrocarbons, aromatic hydrocarbons and the like. Several non-limiting examples of such hydrocarbons are n-hexane, n-heptane, n-octane, 2-methylpentane, 3-methylpentene, 2-ethyl pentane, 2-methyl hexane, 3-methyl hexane, 2,4-dimethylhexane, 2,2-dimethylhexane, 2-ethylhexane, 2-methylheptane, 3-methylheptane, benzene, toluene, cyclohexane, cycloheptane, methylcyclopentane, methylcyclohexane, etc. Care should be exercised to prevent more than very minor amounts, usually less than 1 percent by weight of the solvent, of hydrocarbons lower or higher in molecular weight than those of 6 to 9 carbon atoms. Those lower in molecular weight are too volatile and are somewhat dangerous due to low flash points. Further they are less effective as solvents for the asphalts. If too volatile, the solvents volatilize excessively during storage causing potential damage to storage facilities and increasing the viscosity of the adhesive composition. If the solvents are higher in molecular weight than those hydrocarbons of 9 carbon atoms, the adhesive compositions will harden too slowly and will run or exude from the joints. The particularly preferred solvents of the present invention are the saturated aliphatic hydrocarbons of 6 to 9 carbon atoms with n-heptane being the preferred solvent. The amount of the solvent used in preparing the present asphaltic compositions usually comprises 5 to 30 percent by weight of the total composition, preferably 10 to 20 percent by weight of the total composition. Usually, if the present adhesive compositions are to be used under cold climatic conditions, the amount of solvent present is preferably 1 to 3 percent by weight greater than the amount present in compositions of general utilization.

The vermiculite filler of the present compositions is one which is unexpanded and is one of a size such that 100 percent will pass through a 10 mesh screen. Preferably, the unexpanded vermiculite is of a 20-65 mesh size. The unexpanded vermiculite has a flat or tableted shape as opposed to the more spherical shape of expanded vermiculite. Considerably improved adhesive properties are obtained through the use of the flat shaped unexpanded vermiculite. Also, the ease of application of the adhesive composition is increased through the incorporation of the unexpanded vermiculite rather than the expanded material. The amount of the unexpanded vermiculite used in the present composition is usually within the range of 20 to 60 percent by weight of the total composition. Preferably, however, the amount of unexpanded vermiculite is within the range of 35 to 45 percent by weight of the total composition.

The present compositions contain approximately 1 to 10 percent by weight of an asbestos fibre classified as 7M grade under the Canadian Crysolite Asbestos Classification. The asbestos fibre is graded on a Quebec Standard Asbestos Testing machine comprising a series of superimposed boxes having screens with varying meshes. Usually, it is preferred that the present asphaltic compositions contains 2 to 6 percent by weight of the 7M grade asbestos fibre.

In preparing the asphaltic compositions of the present invention, it is usually convenient and preferred that the asphalt be completely dissolved in the solvent to form a cutback asphalt. This cutback asphalt generally has a Brookfield viscosity at 77° F. of 1500 to 2500 centipoise and a specific gravity at 60° F. of 0.959. To this cutback asphalt, the asbestos and unexpanded vermiculite are then added and thoroughly intermixed to produce a uniform dispersion of these materials through the asphaltic composition.

The asphaltic compositions of the present invention should have the following properties: Stormer S. P. viscosity at 1500 g., 50 revolutions and at 77° F. of 40 to 200 seconds, flash point (ASTM D93-58T) of greater than 10° F., a drying time at 77° F. for a 1/16" film to the ordinary touch of 15 minutes.

In using the present adhesive compositions to adhere wooden nailing strips to concrete surfaces, the adhesive composition is either applied by trowel or sprayed onto either the concrete or wooden surfaces or both at ambient temperatures, i.e., 30 to 105° F. Sufficient pressure is then applied to the wooden member or the concrete member or both to cause the wooden member to adhere to the concrete member through the medium of the present asphaltic compositions. Preferably, at least approximately 15 minutes are allowed between adhesion of the wooden member to the concrete member before the wooden nailing strip is used as such in order to allow the adhesive composition to set or cure, thus strengthening the bond between the wood, asphalt composition and concrete.

In order to demonstrate the present invention two asphaltic compositions were prepared. In each case the asphalt was heated to a temperature of approximately 170 to 200° F. and thoroughly mixed with n-heptane to form a cutback asphalt. The asphalt was an 85 to 100 mm./10 penetration asphalt (at 77° F.) and obtained by distillation of a crude oil from Smackover Field, Smackover, Ark. While at approximately room temperature, Grade 7M asbestos fibres were added to the cutback asphalt and the mixture agitated to insure a relatively uniform dispersion. An unexpanded vermiculite of 20-65 mesh size known commercially as Zonolite No. 4 ore was then added to the mixture and uniformly dispersed therethrough by agitation. The following table presents the concentrations of the components in the two asphaltic compositions.

| Component | Weight percent | |
|---|---|---|
| | Composition No. 1 | Composition No. 2 |
| Asphalt | 45.3 | 44.3 |
| n-Heptane | 11.3 | 12.9 |
| Unexpanded vermiculite | 39.0 | 38.4 |
| Asbestos | 4.4 | 4.4 |

Both Composition No. 1 and Composition No. 2 above were tested by troweling the compositions onto a horizontal concrete surface at ambient temperatures to form a strip approximately 3 to 4 inches wide and 3/16 inch thick. A piece of wood 10 feet long 4 inches wide and 2 inches thick was then pressed with a firm pressure by hand into contact with the asphaltic compositions. After approximately 16 hours the wood was found to be well adhered to the concrete surface such that the use of the wood as a recipient of nails for anchoring flooring and studding to the wood resulted in no slippage or loss of adhesion between the wood and the concrete.

What is claimed is:

1. A method of adhering wooden surfaces to concrete surfaces which comprise applying to one of said surfaces a film of an asphaltic composition comprised of 30 to 60 percent by weight of an asphalt having a penetration at 77° F. of 60 to 160 mm./10, 5 to 30 percent by weight of a solvent comprising a hydrocarbon of 6 to 9 carbon atoms, 20 to 60 percent by weight of an unexpanded vermiculite and 1 to 10 percent by weight of asbestos fibres, and thereafter bringing the two surfaces together under a firm pressure to form a bond between said compositions and said wooden and concrete surfaces.

2. The method of claim 1 wherein the asphalt has a minimum flash point of 500° F. and a minimum softening point of 110° F.

3. The method of claim 1 wherein the solvent is a saturated aliphatic hydrocarbon.

4. The method of claim 3 wherein the solvent is n-heptane.

5. The method of claim 1 wherein 100 percent by weight of the unexpanded vermiculite will pass through a 10 mesh screen.

6. The method of claim 1 wherein the amount of asphalt present is 40 to 50 percent by weight.

7. The method of claim 1 wherein the amount of solvent present is 10 to 20 percent by weight.

8. The method of claim 1 wherein the amount of vermiculite present is 35 to 45 percent by weight.

9. The method of claim 1 wherein the amount of asbestos present is 2 to 6 percent by weight.

References Cited

UNITED STATES PATENTS

| | | | |
|---|---|---|---|
| 2,149,026 | 2/1939 | McBride | 156—71 |
| 2,149,162 | 2/1939 | Coleman | 156—71 |
| 2,229,742 | 1/1941 | Kauffman | 94—3 |
| 2,393,774 | 1/1946 | Hoieberg et al. | 106—280 |
| 2,923,639 | 2/1960 | Wilkinson | 106—282 |
| 3,085,482 | 4/1963 | Yakubik. | |

FOREIGN PATENTS 528,961    8/1956    Canada.

JULIUS FROME, *Primary Examiner.*

J. B. EVANS, *Assistant Examiner.*

U.S. Cl. X.R.

52—390; 94—3; 106—280, 281, 282; 117—123, 149; 161—202, 237